(12) United States Patent
Popescu et al.

(10) Patent No.: US 11,080,726 B2
(45) Date of Patent: Aug. 3, 2021

(54) OPTIMIZATION OF DEMAND FORECAST PARAMETERS

(71) Applicant: Oracle International Corporation, Redwood Shores, CA (US)

(72) Inventors: Catalin Popescu, Atlanta, GA (US); Brent Li, Lexington, MA (US); Lawrence Leo Mesquita, Dunwoody, GA (US)

(73) Assignee: Oracle International Corporation, Redwood Shores, CA (US)

( * ) Notice: Subject to any disclaimer, the term of this patent is extended or adjusted under 35 U.S.C. 154(b) by 295 days.

(21) Appl. No.: 16/117,164

(22) Filed: Aug. 30, 2018

(65) Prior Publication Data

US 2020/0074485 A1 Mar. 5, 2020

(51) Int. Cl.
*G06Q 30/02* (2012.01)
*G06Q 10/08* (2012.01)

(52) U.S. Cl.
CPC ....... *G06Q 30/0202* (2013.01); *G06Q 10/087* (2013.01)

(58) Field of Classification Search
USPC ........................................................ 705/7.31
See application file for complete search history.

(56) References Cited

U.S. PATENT DOCUMENTS

| | | | |
|---|---|---|---|
| 8,620,707 B1 | 12/2013 | Belyi et al. | |
| 9,990,597 B2 * | 6/2018 | He | G06Q 10/087 |
| 10,002,364 B2 | 6/2018 | Gopinath et al. | |
| 2003/0130883 A1 * | 7/2003 | Schroeder | G06Q 10/04 705/7.31 |
| 2005/0288993 A1 | 12/2005 | Weng et al. | |
| 2009/0125385 A1 * | 5/2009 | Landvater | G06Q 10/087 705/7.31 |

(Continued)

OTHER PUBLICATIONS

Unknown, "Oracle Retail Demand Forecasting", Datasheet; Retrieved Oct. 31, 2017 from www.oracle.com/us/products/applications/026067.pdf.

(Continued)

*Primary Examiner* — Folashade Anderson
(74) *Attorney, Agent, or Firm* — Potomac Law Group, PLLC

(57) ABSTRACT

Embodiments select demand forecast parameters for a demand model for one or more items, receive historical sales data for the items on a per store basis and receive a plurality of seasonality curves for a first item. Embodiments determine a repeatability of each of the seasonality curves using a correlation of each seasonality curve over year to year demand and retain a first seasonality curve based on the repeatability. Embodiments determine a smoothness of the first seasonality curve and determine a sparsity of the first seasonality curve. Based on the determined repeatability, smoothness and sparsity, embodiments determine that the first seasonality curve is reliable and repeat the receiving the plurality of seasonality curves, determining the repeatability, determining the smoothness, and determining the sparsity to determine a plurality of reliable seasonality curves. Embodiments use the demand model and the reliable seasonality curves and determine a demand forecast for the first item.

20 Claims, 8 Drawing Sheets

(56) References Cited

U.S. PATENT DOCUMENTS

| | | | |
|---|---|---|---|
| 2009/0259509 A1* | 10/2009 | Landvater | G06Q 10/06315 |
| | | | 705/7.31 |
| 2010/0138273 A1* | 6/2010 | Bateni | G06Q 30/0202 |
| | | | 705/7.31 |
| 2012/0284084 A1 | 11/2012 | Popkov et al. | |
| 2013/0179220 A1 | 7/2013 | Notani et al. | |
| 2013/0185116 A1 | 7/2013 | Popkov et al. | |
| 2013/0211878 A1* | 8/2013 | Kushkuley | G06Q 30/0202 |
| | | | 705/7.31 |
| 2015/0006292 A1* | 1/2015 | Li | G06Q 30/0264 |
| | | | 705/14.61 |
| 2016/0210591 A1 | 7/2016 | Lafrance | |
| 2016/0239776 A1 | 8/2016 | Feng et al. | |
| 2017/0068973 A1 | 3/2017 | Sinkel | |
| 2017/0083967 A1 | 3/2017 | Shiely et al. | |
| 2017/0154349 A1 | 6/2017 | Popescu et al. | |
| 2017/0169446 A1 | 6/2017 | Li et al. | |
| 2019/0130425 A1* | 5/2019 | Lei | G06Q 10/0631 |
| 2019/0188536 A1* | 6/2019 | Lei | G06Q 30/0202 |
| 2020/0104771 A1* | 4/2020 | Popescu | G06Q 30/0202 |
| 2020/0111109 A1* | 4/2020 | Lei | G06N 3/08 |

OTHER PUBLICATIONS

International Search Report and Written Opinion issued in the corresponding International Application No. PCT/US2019/043166, dated Sep. 27, 2019.

* cited by examiner

| | week 1 | week 2 | week 3 | week 4 | week 5 | week 6 | week 7 | week 8 | week 9 | week 10 | week 11 | week 12 | week 13 |
|---|---|---|---|---|---|---|---|---|---|---|---|---|---|
| item's promo demand | 12 | 10 | 11 | 13 | 20 | 11 | 13 | 12 | 22 | 13 | 13 | 10 | 12 |
| item's non-promo demand | 12 | 10 | 11 | 13 | 12 | 11 | 13 | 12 | 12.5 | 13 | 11 | 10 | 12 |
| promotion | 0 | 0 | 0 | 0 | 1 | 0 | 0 | 0 | 1 | 0 | 0 | 0 | 0 |

OPTIMIZATION OF DEMAND FORECAST PARAMETERS

FIELD

One embodiment is directed generally to a computer system, and in particular to a computer system that forecasts demand for retail items.

BACKGROUND INFORMATION

Products are typically delivered to consumers through a network of manufacturers, distributors, transporters, retailers, etc. Such a network of facilities that together deliver products to consumers is commonly referred to as a "supply chain" network Suppliers of products (e.g., manufactures, vendors, retailers, etc.) often face the task of forecasting the demand for the products in order to provide a smooth and efficient flow of the products through the supply chain network in the presence of constantly-changing market conditions. Overestimating the demand can result in overproduction and increased costs associated with holding inventories (e.g., storage costs, obsolescence, etc.). Underestimating the demand, on the other hand, can result in lost revenues.

Further, in the retail industry, retailers need to predict their demand in the future to better manage their inventory or promotion/markdown planning. Retailers may engage in many types of promotions to boost their sales. To generate an accurate forecast, a retailer has to consider all factors/features which could impact the demand, such as promotions, price, seasonality, weather, etc.

In general, sales forecast systems encounter problems in producing a week-by-week forecast of sales units for retail items. The sales of retail items in a given week is affected by many factors, such as seasonal factors, whether a discount has been applied to a retail item during the week, and at what point in the lifecycle of a merchandise the week falls. One common approach to forecasting weekly sales units involves building a "causal demand model" for retail items. This demand model is a mathematical model that describes weekly sales units in terms of factors such as the ones listed above. The factors are known as the "demand variables" that form a demand model.

The demand model specifies mathematically how the demand variables affect sales units. For example, if the amount of discount is a demand variable, historical data may show that a 50% price cut resulted in a 4-fold increase in sales units (i.e., related to price elasticity). In this example, the demand variable is a 50% price cut and the historical sales data is the 4-fold increase in sales. In order for the causal demand model to be of use in forecasting sales units, it is necessary to determine the relationship of the demand variable (50% price cut) to the sales units (4-fold increase). This relationship is referred to as the "demand parameter" associated with the demand variable.

In this example, the demand parameter may be determined to specify that for every 25% price reduction, sales of a particular retail item will increase by 2-fold. With the demand parameter determined, it is then possible to forecast sales units by specifying the future values of the demand variables. To continue the price cut example, the retailer might know that next season it will be running a 40% price cut during some weeks. The demand model will then forecast sales units for those weeks accounting for the 40% price cut.

The demand parameter is determined by examining historical retail sales data (known as "retail panel data") containing price cuts for the retail item itself, or for similar retail items. However, as noted above, several demand variables affect the sales of retail items. These several demand variables apply simultaneously. For example, a retailer may have performed the 50% price cut during the summer for a summer item, in which case the 4-fold increase in sales may be partially due to an increase in seasonal demand for summer retail items during summer. To separate the effects of the several demand variables on sales, a regression is performed on the demand model to determine values for demand parameters that cause the demand model to best fit retail panel data.

Further, the quality of a sales forecast is very dependent on the quality of the input data (i.e., garbage in, garbage out). In many situations, the historical data necessary and available for sales forecasting is less than adequate, and the resulting forecasts can do more harm than good. Some known sophisticated forecasting solutions offer an exception driven workflow, where such bad forecasts are detected and a forecast analyst is prompted to review and adjust the forecast manually. Less sophisticated solutions do not catch the bad numbers, which can result in over/understock, wrong allocations, bad plans, etc.

SUMMARY

Embodiments select demand forecast parameters for a demand model for one or more items. Embodiments receive historical sales data for the items on a per store basis and receive a plurality of seasonality curves for a first item. Embodiments determine a repeatability of each of the seasonality curves using a correlation of each seasonality curve over year to year demand and retain a first seasonality curve based on the repeatability. Embodiments determine a smoothness of the first seasonality curve and determine a sparsity of the first seasonality curve. Based on the determined repeatability, smoothness and sparsity, embodiments determine that the first seasonality curve is reliable and repeat the receiving the plurality of seasonality curves, determining the repeatability, determining the smoothness, and determining the sparsity to determine a plurality of reliable seasonality curves. Embodiments use the demand model and the reliable seasonality curves and determine a demand forecast for the first item. Embodiments then electronically send the demand forecast to an inventory management system which is configured to generate shipments of additional quantities of the first item to a plurality of retail stores based on the demand forecast

BRIEF DESCRIPTION OF THE DRAWINGS

FIG. 7 illustrates example promotion effects over a 13-week sales cycle for an item in accordance to embodiments.

DETAILED DESCRIPTION

Figure 1:
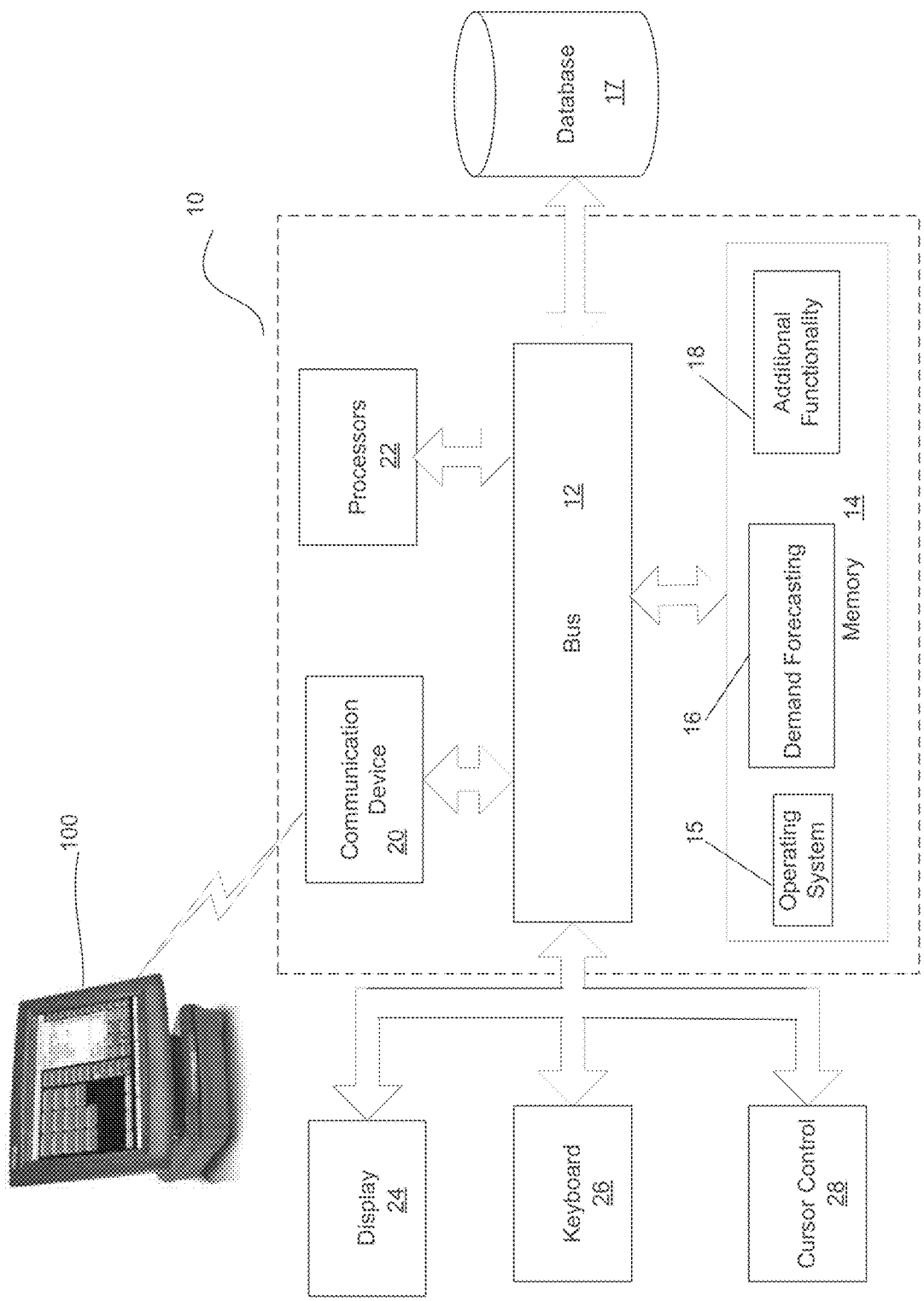
FIG. 1 is a block diagram of a computer server/system in accordance with an embodiment of the present invention.

Embodiments automatically determine problematic demand forecast model parameters and then remove the problematic parameters from the demand forecast and replace with reliable parameters. As a result, the demand forecast is optimized and more accurate.

Sales demand forecasting methods can roughly be grouped into judgmental, extrapolation, and causal methods. Extrapolation methods use only the time series data of the activity itself to generate the forecast. Known particular techniques range from the simpler moving averages and exponential smoothing methods to the more complicated Box-Jenkins approach. While these known methods identify and extrapolate time series patterns of trend, seasonality and autocorrelation successfully, they do not take external factors such as price changes and promotion into account.

Vector Auto Regression ("VAR") models extend the Box-Jenkins methods to include other variables, but their complexity makes estimation difficult. Causal forecasting involves building quantitative models using inputs representing the phenomena that are believed to be drivers of the outcome. The models can be as simple as a linear regression model with promotion variables. A starting point is a regression model with promotion variables such as price cuts, rebates or advertisements. The idea is that model simplicity helps managers to understand and approve or guide modification of the models, and as they become more knowledgeable about a decision aid, they may be ready to implement more sophisticated and complex models.

Therefore, in general, the problem of estimating promotion effects on demand and sales for retail items can be approached two ways. In one method, the promotion effects can be estimated directly at the item/store level (e.g., for every individual stock keeping unit ("SKU") at every individual retail store, also referred to as a "granular level"). However, the available demand and promotion data at this level is typically insufficient, making any estimation generally unstable, and the results generally inaccurate.

In another method, the promotion effects can be estimated at a more aggregate level, such as for all the retail stores in an entire region. The data at this level is generally much more stable and prevalent, allowing for a robust estimation of promotion effects. However, the richness of the data at this level is also a challenge. If all of the available data points are considered, the generating of an estimation using a computer can be very slow, due to the large amount of data that needs to be processed, and the output can be unduly influenced by outliers. On the other hand, if only data points that pass some pre-defined criteria are included (i.e., using data filtering), the processing speed is increased, but the output is biased and dependent on the pre-defined criteria.

For example, some forecasting systems pool the data from various SKUs or categories, so that some categories with very little data are excluded. This causes the forecasting for those categories to be inaccurate. Further examples of filtering including making corrections in the data to account for unusual events such as: (1) Weather-related; (2) Inflated demand (e.g., people stocking up on water before a storm); (3) Low demand (e.g., a store is closed during a hurricane resulting in lower than usual demand); (4) Supply chain (e.g., out of stock situations causing merchandise to sell below usual levels); and (5) Hardware/IT (e.g., computer hardware or software failures can result in incorrect capturing of demand). All of the above need to be caught and either corrected for, or made sure to be excluded from the analysis.

The following terms apply to embodiments of the invention:

The term "item" or "retail item", as used herein, refers to merchandise sold, purchased, and/or returned in a sales environment. The terms "particular item" and "single item" are used interchangeably herein and refer to a particular item type (e.g., to a particular type of cellular telephone such as an iPhone 8), not to a unit item.

The terms "period", "time period", "retail period", or "calendar period", as used herein, refer to a unit increment of time (e.g., a 7-day week) which sellers use to correlate seasonal periods from one year to the next in a calendar for the purposes of planning and forecasting. The terms may be used interchangeably herein.

The term "sales channel" or "location" or "retail location", as used herein, may refer to a physical store where an item is sold, or to an online store via which an item is sold.

The term "sales data", as used herein, refers to historical sales and promotion information that has been recorded for an item that has been sold in past retail periods (e.g., over 52 weeks of the past year). Sales data may include, for example, a number of units (or a monetary amount) of an item sold in each retail period, along with data characterizing one or more types of promotions for the item. Sales data may be stored in a database, for example.

The terms "promotion" and "sales promotion" are used interchangeably herein and refer to a particular type of promotion for an item. Some examples of promotion components may include a price discount promotion component, a television advertisement component, a radio advertisement component, a newspaper advertisement component, an internet advertisement component, an email advertisement component, and an in-store advertisement component.

The term "promotion effect" refer to a numerical value that characterizes the effect (e.g., the effect on sales and profitability) of promoting an item. For example, an estimated promotion effect of 2.0 may indicate that a promotion, or combination or promotions, is estimated to result in twice as many sales (a 100% increase) for an item. Promotion effects (i.e., values) may be used in a demand forecast model to forecast a demand for an item. Promotion effects may also be used in a computerized inventory system to control various aspects of inventory for an item.

Embodiments, in general, utilize the following demand model or function is used for demand forecasting ("equation (1)"):

$$\text{Demand} = \text{base demand} * \text{seasonality} * \text{promo effects} \quad (*\text{additional effects}) \tag{1}$$

Where "base demand" is the historical demand without taking account any effects or other factors, seasonality is the impact on demand based on the season (i.e., time of year), and promo effects are the effects on demand based on one or more promotions offered during a time period. Many demand models take into account additional effects, such as the weather. For example, if the current year's weather differs significantly from the previous year, and from two years ago, the forecast may need corrections. For example, if the hot weather during Summer is longer this year, the forecast for steaks and ice cream may need to be increased. Another additional effect can be the inventory. If a popular fashion is out of some sizes and/or colors, the forecast may need to be adjusted downward to account for the missing articles. Yet another effect can be store count. If the retailer plans to aggressively expand, and increase the number of stores by 10% in the following year, the forecast needs to be adjusted accordingly. However, for purposes of embodiments of the invention, it is assumed that seasonality and promotion effects have the overwhelmingly largest impact on the sales forecast. Therefore, in embodiments, after estimated seasonality and promotion effects are determined, they are run through a series of verifications to make sure they are reliable and accurate.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 1, such as a keyboard or display.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a demand forecasting module 16 that determines optimal demand forecast parameters for demand forecasting, and all other functionality disclosed herein. System 10 can be part of a larger system. Therefore, system 10 can include one or more additional functional modules 18 to include the additional functionality, such as a retail management system (e.g., the "Oracle Retail Demand Forecasting System" or the "Oracle Retail Advanced Science Engine" ("ORASE") from Oracle Corp.) or an enterprise resource planning ("ERP") system. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 100 generates the transactional data and historical sales data (e.g., data concerning transactions of each item/SKU at each retail store) used to forecast demand. POS terminal 100 itself can include additional processing functionality to forecast demand in accordance with one embodiment and can operate as a specialized demand forecasting system either by itself or in conjunction with other components of FIG. 1.

In one embodiment, particularly when there are a large number of retail stores, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As disclosed, the known exception driven workflow for demand forecasting relies on a human to review numbers, making it time consuming and error prone. In contrast, embodiments automatically detect problematic forecast demand parameters that were estimated based on unreliable historical data points. Once the unreliable parameters are identified, embodiments remove them from the demand model, and they are replaced with optimized parameters that may be borrowed from similar products or locations. This greatly lowers the number of exceptions that need to be reviewed and generates more accurate forecasts.

The demand parameters can be initially unknown, and the demand model can be configured to provide the demand parameters. By generating an accurate determination of demand parameters, more accurate sales forecasts can be achieved.

For example, for some demand models, a 50% price cut results in a 4-fold increase in sales units. This is not simply an arbitrary selection of a value. Instead, the relationship between the discount demand variable and sales units is determined though a method of calculation. In particular, the demand parameter can be determined by examining historical data containing price cuts for the merchandise itself. The determination process is called "estimation," and can involve estimation routines that examine the historical sales data and apply various statistical approaches.

Figure 2:
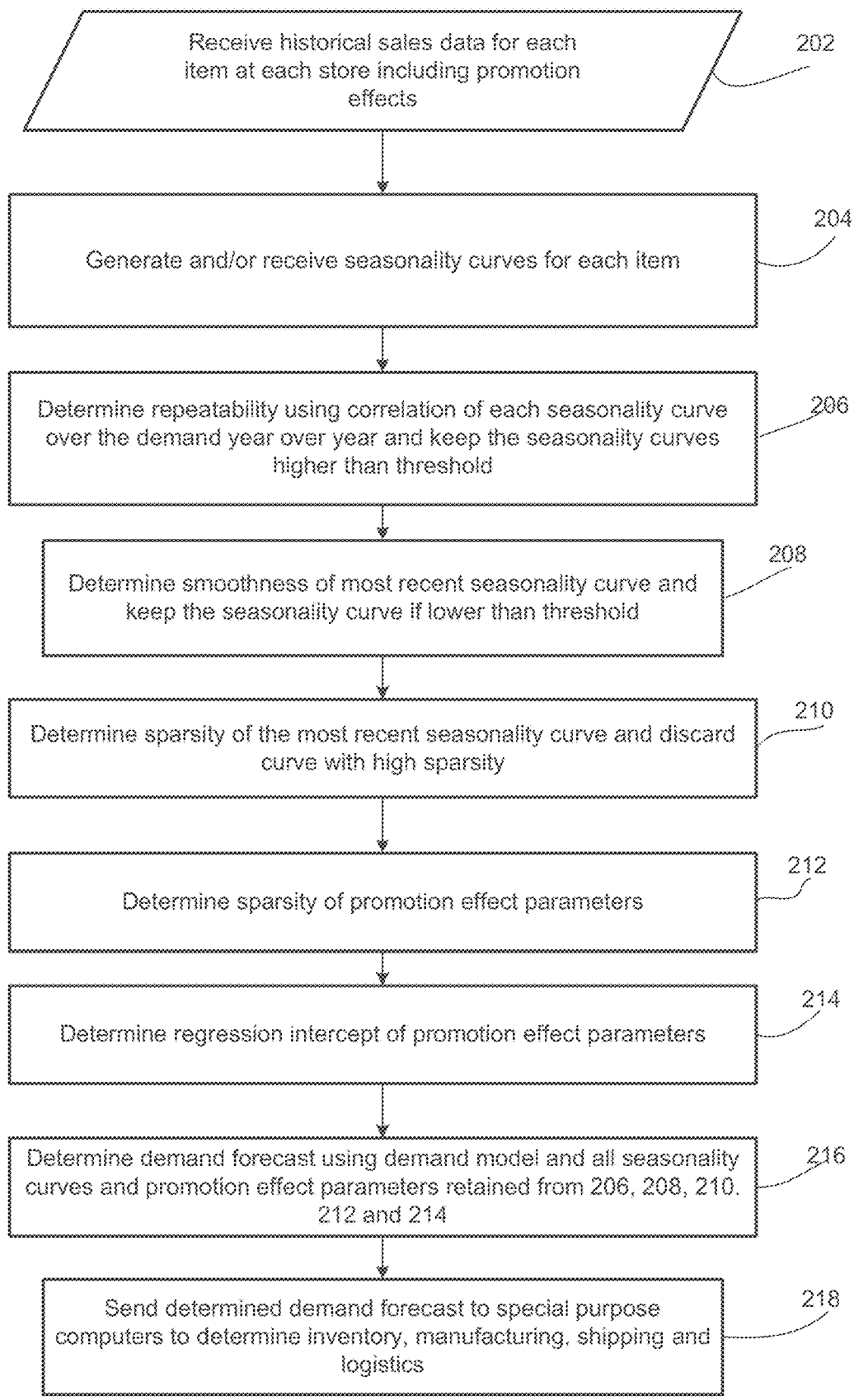
FIG. 2 is a flow diagram of the functionality of a demand forecasting module of FIG. 1 when automatically verifying demand parameters of seasonality and promotion effects in accordance with one embodiment.

Embodiments, after estimating the seasonality and promotion effects parameters, perform a series automatic verifications to ensure that they are reliable and accurate. FIG. 2 is a flow diagram of the functionality of demand forecasting module 16 of FIG. 1 when automatically verifying demand parameters of seasonality and promotion effects in accordance with one embodiment. In one embodiment, the functionality of the flow diagram of FIG. 2 (and FIG. 5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, historical sales data is received for all items for all stores for a particular class/category of products. For example, the class/category can be "yogurt", "coffee" or "milk." Each class has one or more subclasses, all the way down to the SKU or Universal Product Code ("UPC") level, which would be each individual item for sale, For example, for the class of yogurt, a sub-class could be each brand of yogurt, and further sub-classes could be flavor, size, type (e.g., Greek or regular), down to an SKU which would correspond to every individual different type of yogurt item sold. Each SKU or UPC would be considered a discrete data point or discrete item.

Historical sales and performance data may include, for example, data representing past sales and promotions of an item across a plurality of past retail periods, as well as the associated seasonality for each time period (e.g., Spring, Summer, Fall, etc.). The historical performance data may be segmented into retail periods of past weeks, with each past week having numerical values assigned to it to indicate the number of items sold for that week. The historical performance data may also include numerical values representing price discounts and values of other promotion components across the retail periods, in accordance with one embodiment. The historical performance data for an item may be accessed via network communications, in accordance with one embodiment, including being accessed from each POS terminal 100 at each retail store and/or accessed from database 17.

At 204, seasonality curves are generated and/or received for one or more items based on the historical sales data. The seasonality curves are generated using known techniques, and embodiments of the invention then determine if the generated seasonality curves are reliable. In other embodiments, the seasonality curves can be included in the historical sales data at 202. A seasonality curve, in one embodiment, is a set of weekly demand parameters that represent seasonal variations in the demand for merchandise. They represent effects that are not accounted for in the general forecasting model. Seasonality curves are mapped to specific items based on merchandise, location, and season code, and are modeled as a parameter over a time series.

Figure 3:
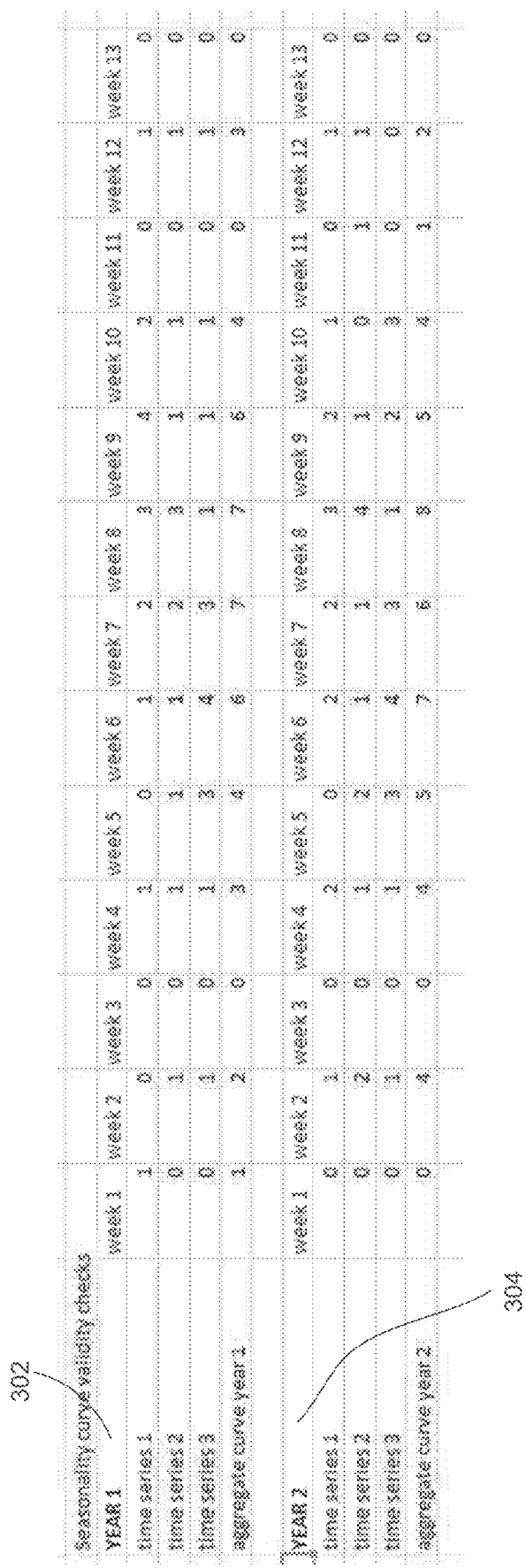
FIG. 3 illustrates example seasonality curves for an item over two complete sales cycles in accordance to embodiments.

FIG. 3 illustrates example seasonality curves for an item over two complete sales cycles in accordance to embodiments (year 1 at 302 and year 2 at 304). In other embodiments, more than two sales cycles can be used. Each year includes seasonality parameters for three seasonality curves and an aggregate curve for each year. In general, a seasonality curve is at a higher intersection than a single SKU/store and covers multiple item/store combinations because a single SKU/store would be too sparse regarding the amount of data. For example, for ice cream, most ice cream items will likely have the same seasonal pattern for all of the stores in Florida. The simplified example of FIG. 3 uses three time series to show how the seasonality curve (i.e., the aggregate curve) covers multiple item/store combinations (time series). The three time series could be, for the ice cream example, Vanilla ice cream at a store in Miami, Raspberry ice cream at the same store in Miami, Strawberry ice cream at a store in Tampa, and so on. The relevant seasonality curve would be the aggregate of those time series.

Three time series in FIG. 3 were chosen as a simplified example. In reality there would a much large number. Further, 13 weeks are also chosen as a simplified example in FIG. 3. For most items, in general, the number of weeks of a sales cycle is 52 (one year). However, for fashion items, the entire selling cycle may only last 13 week before they go out of style and are replaced by the next fashion item.

The numbers shown in FIG. 3 represent units sold in that period for the given time series. When there is a 0, there were no sales for that period. The aggregate is the sum of all units for a certain period.

Using only two sales cycles, as with the example of FIG. 3, or some other predefined number of cycles, does not guarantee that the seasonal pattern is repeatable year over year. Therefore, embodiments run a series of validity checks on the seasonality curves. Specifically, at 206 of FIG. 2, repeatability using correlation of a seasonality curve over the demand in the two years (or however many sales cycles is used) is determined. If the correlation is poor, the repeatability of the seasonal pattern is not acceptable and the curve is discarded. If the correlation is good (higher than a threshold), the curve is kept.

For the example of FIG. 3, a correlation threshold of 0.9 is used. The determined correlation year over year ("YOY") between year 2 and year 1 is 0.929099493 (where a correlation of +1 indicates perfect positive correlation, −1 indicates perfect negative correlation, and 0 indicates no correlation). Therefore, the aggregate curve for year 2 correlates with the aggregate curve for year 1 better than required by the correlation threshold, so it is kept as aggregate curve 2. In other words, because the correlation test is passed, the YOY seasonality pattern is acceptable. Both curves 1 and 2 will be kept, but curve 2 will be used for further calculations since curve 2 is based on the most recent demand. Typically there are two sales cycles as shown in FIG. 3. If more sales cycles are available, embodiments use the two most recent ones, so there would still be curves 1 and 2 as in FIG. 3.

At 208, the smoothness of the most recent acceptable (i.e., the YOY pattern is established to be acceptable) seasonality curve of demand data is determined (i.e., curve 2 in the example of FIG. 3). There are many reasons for a seasonality curve to be jerky (i.e., not smooth). For example, if promotional demand was not accounted for, or a low/high pricing policy was in effect. A low/high pricing policy is a pricing policy that some retailers practice for some merchandise. For such a policy, items do not sell when the price is high, and sell very well when the price is lowered. That will be reflected as a jerky demand pattern. The opposite of such a policy is, for example, an "every day low price" strategy.

Having spikes in seasonality in the wrong periods can greatly negatively impact the forecast accuracy. To avoid this, embodiments determine the standard deviation of the seasonality curve. If it is high (i.e., above a standard deviation threshold), the curve has too much variability and is discarded. If it is low (less than the threshold), the curve is kept.

In the example of FIG. 3, the standard deviation threshold of curve 2 (i.e., the curve with the most recent demand data) is 1.5, and the calculated standard deviation curve 2 is 0.77064119. Therefore, in this example curve 2 is kept. Otherwise it is discarded.

At 210, sparsity of the seasonality curve is determined, meaning embodiments determine if there is a sufficient amount of available data to estimate the seasonality. If few data points are available, the seasonality curve may be too sparse, and thus unreliable. To check for sparsity, embodiments determine the number of seasonal indices that are zero (i.e., zero sales that week), when the seasonality is expected to be strong. If the number is high, the curve is discarded. If it is acceptable (less than a zero index threshold), the curve is kept.

In the example of FIG. 3, the zero index threshold is 5. The count of the values in curve 2 that are zero is 3. The curve has 3 periods that have a zero value (weeks 1, 3 and 13). This is less than allowed by the threshold, so this curve passes the test, and is not discarded. Otherwise, it is discarded.

The functionality of 206, 208 and 210 repeats itself for as many seasonality curves to be "tested." As a result of 206, 208 and 210, only reliable seasonality curves remain in order to generate a demand sales forecast (i.e., all unreliable seasonality curves will have been discarded).

Next, embodiments determine the reliability of the promotion effects. Even more than seasonality, the promotions have a significant impact on demand. It is therefore necessary to make sure they are accurate and robust.

Figure 4A:
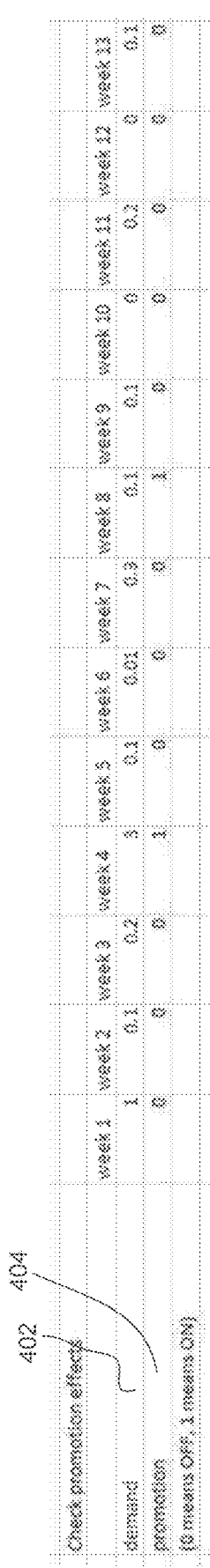
FIG. 4A illustrates promotion effect parameters over a 13-week sales cycle for an item in accordance to embodiments.

FIG. 4A illustrates promotion effect parameters over a 13-week sales cycle for an item in accordance to embodiments. Row 404 indicates whether a promotion exists or is active during the time period (0 indicates no active promotion effect, 1 indicates an active promotion effect or multiple active promotions during that time period). Row 402 indicates the corresponding demand. A number less than 1 in row 402 would indicate that the corresponding active promotion(s) do not have a positive effect on demand because of, for example, bad data or unreliable promotions.

At 212, the sparsity of the promotion effect parameters is determined. Embodiments determine if enough data points were used to estimate the impact of promotions on demand. A data point is a number greater than zero. If the number is too low the effects are discarded, since they are likely unreliable. All of the promotion effect parameters are discarded since when modeling demand it is better to not include unreliable effects. If the number of data points is acceptable (larger than a threshold) the effects are kept.

In the example of FIG. 4A, the minimum number of data points threshold is 10. The number of data points available is 11, because of the 13 weeks, 2 weeks have a demand of 0, so the promotion effect is deemed reliable In embodiments, the estimation of promotion impact on demand is regression-based using known linear or step-wise regression techniques. Regression works well in the majority of cases, but there are some data patterns that are difficult to predict. For example, when an item is only selling when it is promoted, it is not possible to detach the baseline demand from the promotional demand in a programmatic way. Another situation when detaching is difficult is when an item is promoted very frequently. Therefore, at 214, embodiments check for the regression intercept. During the promotion effects estimation, the regression also calculates the intercept, which is a proxy for baseline demand. If the intercept is low, the promotion effects are unstable, and thus discarded. If the intercept is acceptable (larger than a threshold) the effects are kept and used in the demand forecast model. The intercept (often labeled the constant) is the expected mean value of Y when all X=0.

Figure 4B:
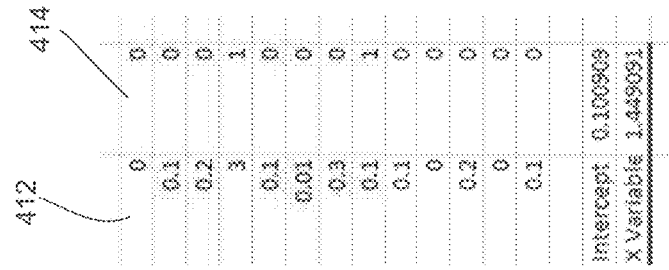
FIG. 4B illustrates a regression intercept calculation for the promotion effects of FIG. 4A in accordance with embodiments.

FIG. 4B illustrates the regression intercept calculation for the promotion effects of FIG. 4A in accordance with embodiments. Column 412 is the demand impact from FIG. 4A and column 414 is the promotion effects from FIG. 4A. In the example of FIG. 4B, the minimum intercept threshold is 0.5. The calculated intercept is 0.10090909 with an X variable of 1.44909091. The X variable is the calculated effect of the promotion. In this example, when the promotion is active, a 45% increase in demand is expected. Because in this example the calculated intercept is less than the minimum allowed, the promotional effects are discarded.

At 216, the demand forecast is calculated using the demand model disclosed above (equation 1), and all of the seasonality curves and promotion effects that were retained after the functionality above. The demand forecast is for a single item at a single store or it can be generated at the intersection where items are replenished or planned. Typically, forecasts used in replenishment are generated for a single item at a single store for a number of weeks or days. For planning purposes, the forecasts can be generated for an entire style and certain regions, or even all stores.

As a result of the functionality of FIG. 2, the unreliable parameters have been identified and removed, making the demand model more accurate. Specifically, the unreliable parameters are removed. What is used are the remaining parameters. For example, if an embodiment generates 10 sets of parameters (i.e., each set can be used to generate a demand model), after the reliability checks of FIG. 2, 6 sets may be discarded. What is used during forecasting is one of the remaining 4 sets. Functionality disclosed below can determine which of the 4 sets is used to optimize the model.

At 218, the determined demand forecast is used for manufacturing production, shipping logistics, and inventory control. The final demand forecast is sent to other specific purpose computers in one embodiment, such as an inventory control system, a manufacturing system, a shipping and logistics system, and a sales assistance system. The final demand forecast in one embodiment is in the form of individual data bits that have been translated from the demand forecast and that are stored and transmitted to other specialized computer systems, where they are stored and utilized by those systems. As a result, additional items may be manufactured, stored, shipped, etc. and items can be optimally priced.

In addition to removing unreliable parameters from the demand model, embodiments select the "best" parameters so that the demand model is further optimized. For example, in examples where, out of 10 sets of parameters, 6 sets are discarded as a result of the functionality of FIG. 2, embodiments can select the best set of parameters from the 4 remaining sets to select the optimized model.

Known sophisticated forecasting solutions mine historical sales data to determine sales patterns, and promotion effects. They also use item and location attributes, and outside factors such as weather to create a holistic view of future demand.

There are generally two known approaches for demand forecasting. The first approach uses the information disclosed above (i.e., seasonality curves, promotion effect parameters, and other demand model parameters) and builds a forecasting model. That model is then used to forecast demand and is occasionally refreshed to reflect recent demand. A second approach is to generate multiple demand forecasting models and have a person manually pick the one considered the most suitable.

These two approaches have drawbacks. The first approach is simple and straightforward, but it is not rich enough to capture all demand details. To create the accurate forecasts needed for retail activities, having different models for different merchandise and locations is very desired. In the second approach, because it relies on a manual selection of the model, there is a high likelihood that the chosen model is suboptimal and time consuming. If the selection of the model was automated, there is still a chance that the best model is not selected.

In contrast, embodiments generate multiple demand models and automatically discard the models that are a bad fit. For the remaining models, embodiments automatically select the best fit models down to the granular item/store level.

Frequently, however, the merchandise itself has too little historical sales data for embodiments to make a reliable estimate of the demand parameters. Moreover, there are mathematical and statistical reasons why estimation of demand parameters based only on a single item of merchandise can be impractical.

To avoid the problem of too little data for an item to accurately generate demand parameters, historical data of several items can be pooled together, and an overall estimate of demand parameters can be made for all the items simultaneously. Therefore, for example, an elasticity estimate represents a type of average elasticity over all of the several items of merchandise whose historical data has been pooled together. The items of merchandise are presumed to be similar, so that using an average elasticity over all of the items does not seriously misrepresent the elasticity of any particular item.

In one embodiment, the pooling of items is done in a structured and fixed way, using a hierarchy of "pools," each pool containing the smaller pools below it in the hierarchy. This may be a sales hierarchy. Thus, for example, the bottom of the hierarchy may contain pools with only a few items in it, while at the top of the hierarchy is one giant pool containing all of the merchandise sold by the retailer at any of its stores. In between are intermediate pools or intersections such as department-level pools, which contain all of the items in a specific department of the retailer. The hierarchy of pools can be specific to each retailer, and can serve as an organizational principle of the retailer's business. The "level" of a pool is the level of the pool within this hierarchy (for example "department level"). Each level of the hierarchy contains multiple pools. For example, the Department level has one pool for each Department. Similarly, the Sub-class level would have one pool for each sub-class. The pools can also be referred to as partitions.

In one embodiment, a lowest level is the stock keeping unit ("SKU") level. The SKU level can have a vast number of partitions, with each partition being a single item. The next level can be, for example, a color level. The color level can have numerous partitions with each partition including a pool of a single color, which may contain many or few SKUs, depending on the number of items of that particular color. The style level can be above the color level. Above that can be a sub-class level, such as "men's belts." Then, above that level, there can be a class level, like "men's goods." The levels can continue with a department level followed by a division level. The demand parameters can be calculated at each level.

Other structured and fixed hierarchies are also possible. For example, a geographical hierarchy of zip code, city, county, state, country, and continent can be used to organize points of sale. Therefore, the particular hierarchy used as an example in this discussion should not be considered the only possible hierarchy.

The more items that are pooled together, the less representative the estimated demand parameter is likely to be of any particular item. Therefore, in an ideal case, estimates are produced by performing them within each of the smallest, lowest-level pools. Accordingly, each pool receives its own estimate unaffected by the other pools.

Many of the lowest-level pools, however, may also have too few items or too little historical data to make a reliable estimate of demand parameters that is specific to the pool. Nonetheless, the items in such a pool may need forecasts, and hence may need demand parameters.

Consequently, a structured way to enlarge the smallest pools in order to produce demand parameters that are as representative as possible of the small pool may be needed. This structured way of moving to larger pools is known as the "escalation path." The escalation path is a sequence of levels, starting at the lowest, indicating the hierarchy of pools to try when obtaining estimates for a lowest-level pool. The estimates that are to be used by the demand model may be the first ones (along the escalation path) that are reliable. Therefore, an escalation path can be used in a case where demand parameters at a given level are not reliable.

One escalation path is simply based on a rule of thumb that the best approximation to a lowest-level pool is the next smallest containing pool In this case, the escalation path simply consists of going from each level to the next higher level.

In embodiments, the pool/escalation level at which the forecast is ultimately generated is typically item/store/week level. Referring to the demand model of equation (1) above, in embodiments the base demand is generated at the same intersection as the forecast. However, seasonality and promotion effects may be estimated at multiple intersection levels or intersections. For example, there may be seasonality curves generated for intersections including subclass/stores, class/regions, item/channel, etc. The same holds for promotion effects.

However, at forecasting time, for each item/store combination, only one seasonality curve and one set of promotion parameters has to be selected. Embodiments optimize the selection of the seasonality curve and one set of promotion parameters used in the demand model.

Figure 5:
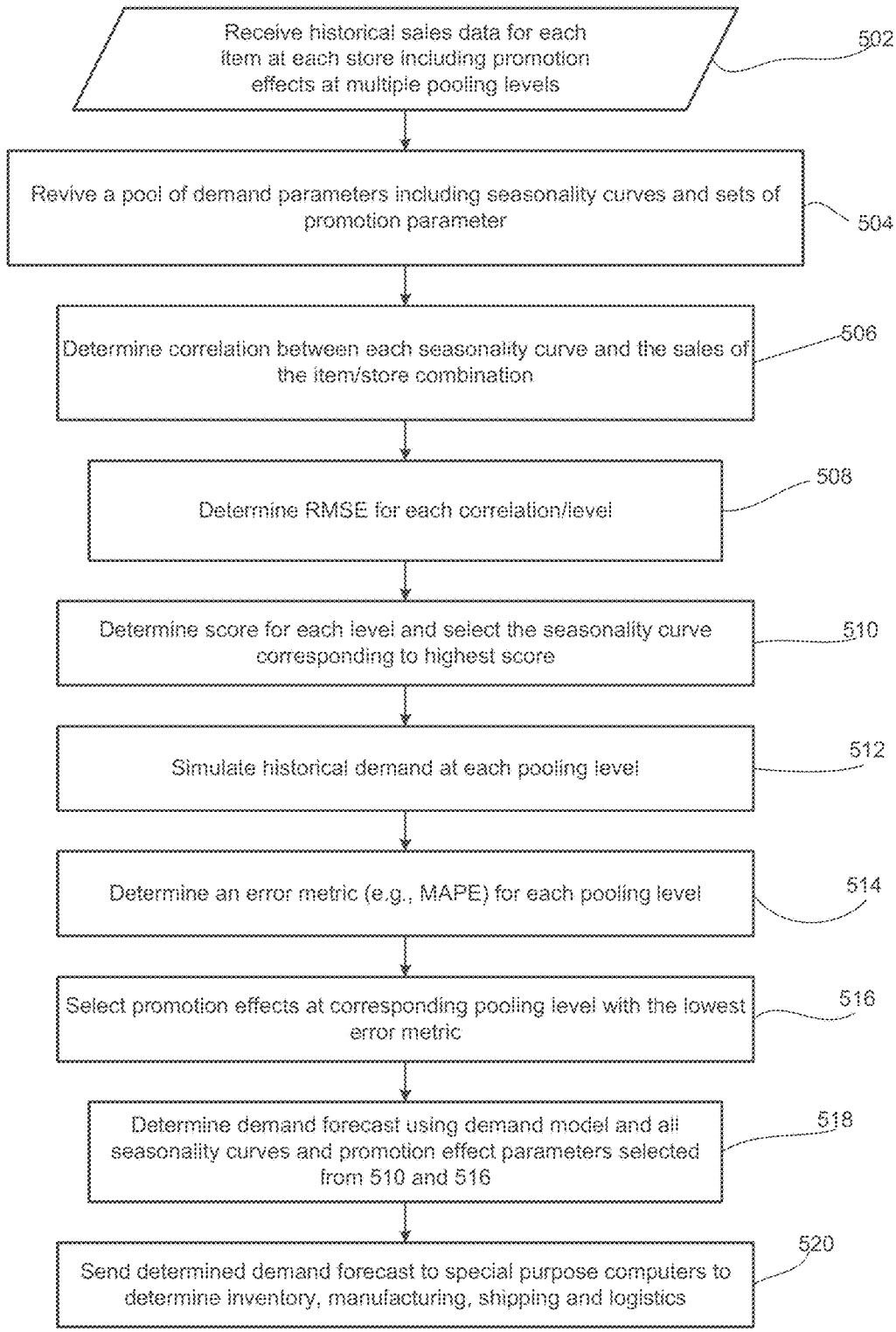
FIG. 5 is a flow diagram of the functionality of the demand forecasting module of FIG. 1 when optimizing the selection of the seasonality curve and one set of promotion parameters used in a demand model in accordance with one embodiment.

FIG. 5 is a flow diagram of the functionality of demand forecasting module 16 of FIG. 1 when optimizing the selection of the seasonality curve and one set of promotion parameters used in a demand model in accordance with one embodiment.

At 502, historical sales data is received for all items for all stores for a particular class/category of products. The historical sales data can be the same data as received at 202 of FIG. 2.

At 504, a pool of demand parameters including seasonality curves and sets of promotion parameter are received. The demand parameters can be estimated parameters as disclosed above. In one embodiment, the demand parameters received are the set of demand parameters deemed reliable after the functionality of FIG. 2 above has been executed.

In connection with the seasonality curves, embodiments consider two aspects when determining optimized seasonality curves. First, embodiments determine how well each curve fits the item/store's sales. Second, embodiments determine if the curve itself is reliable.

Therefore, at 506, a correlation is calculated between each seasonality curve and the sales of the item/store combination. For example, if there are 10 escalation levels, 10 values are recorded for the correlations between sales and curves. For every seasonality curve, the fit is determined using backcasting (i.e., forecasting in the past) and the demand aggregated to the escalation level.

Using fit and demand, at 508 the root mean squared error ("RMSE") is calculated, with the result of having 10 error calculations for every item store.

Finally, at 510 the score is calculated for each level using the following algorithm:

$$score_i = \frac{correlation_i}{1 + penalty * rmse_i}$$

Where the penalty enables the tradeoff between the shape of the curve and the confidence one allows during the estimation of the curve. The criteria for determining the penalty includes whether the user wants the shape of the curve to be determinant in the selection of the curve, or its reliability. The value of the penalty balances the two criteria. Values can change from implementation to implementation, but typical values are between 1 and 5.

When the 10 scores are available, embodiments automatically pick the seasonality curve corresponding to the highest score.

Figure 6:
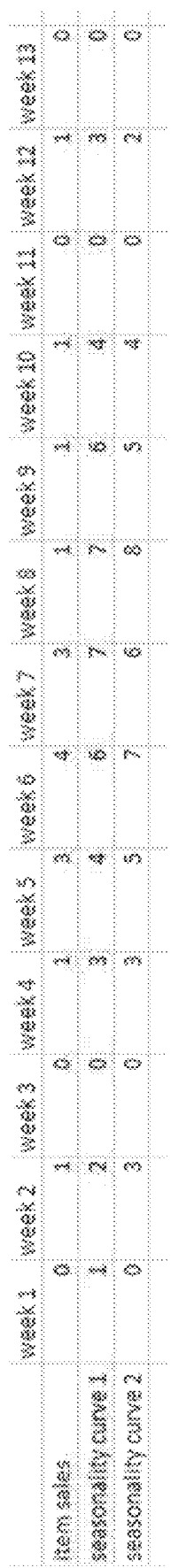
FIG. 6 illustrates two example seasonality curves over a 13-week sales cycle for an item in accordance to embodiments.

FIG. 6 illustrates two example seasonality curves over a 13-week sales cycle for an item in accordance to embodiments. In the example of FIG. 6, at 506 the correlation between the sales and seasonality curves is determined. The correlation of curve 1 is calculated as 0.709224. The correlation of curve 2 is calculated as 0.753982. Then, at 508 the RMSE for curve 1 is calculated as 2.5, and the RMSE for curve 2 is calculated as 3.

Next at 510, the penalty is set, which is a coefficient that weights the errors vs. the correlation. In the example, the penalty is set to 1.5. Then, using the score algorithm disclosed above, the score of curve 1 is calculated at 0.14931 and the score of curve 2 is calculated at 0.137088.

Based on these results, curve 1 "wins" because, although it has a lower correlation (i.e., has a shape less similar to the sales of the item), there is a higher confidence in its estimated value because it has a lower RMSE, making the overall score higher than curve 2. A lower RMSE means that the YOY demand pattern is more stable, giving confidence that the pattern will repeat in the future.

Next, embodiments determine the optimal promotion effects. As with the seasonality curves, the promotion effects can be estimated at various intersections, or pooling levels. For example, assume there are 7 pooling levels. The metrics available to make the decision as to which promotion effects are the "best", having been received at 502 include:

historical demand for each item/store;
historical seasonal demand (with promotion demand removed) for each item/store; and
7 sets of promo effects.

With this information, at 512, the promotional effects are applied on top of the historical seasonal demand to simulate the historical demand, with the result having 7 such metrics, one corresponding to each pooling level. At 514, an error metric is determined for each level by comparing the simulated historical demand with the real historical demand. In one embodiment, the error metric used is MAPE. Other error metrics can include Root mean squared error, Mean absolute error, Mean error, Absolute percentage error, etc. At 516, the promotion effects generated at the pooling level that yield the lowest MAPE (or other metric) is selected.

FIG. 7 illustrates example promotion effects over a 13-week sales cycle for an item in accordance to embodiments. In row 702, a "0" indicates the promotion is not active and a "1" indicates the promotion is active. The simplified example of FIG. 7 is for one promotion or one event. The effect on demand that this promotion has is estimated at two different intersection, thus providing two effects. Embodiments determine which of these two effects to pick.

The example of FIG. 7 illustrate the methodology by using promotion effects coming from two different sources (i.e., two different intersection levels), and showing how embodiments picks the one that fits real demand best (i.e., optimized). In embodiments, multiple promotion effects for one or more items can be applied during the same time period.

First, at 512, the promotion effects (in the example of FIG. 7, only weeks 1 and 9 have promotion effects on) are applied per Equation 1 above (simplified as promoted demand=non-promoted demand*promo effect). In the example of FIG. 7, the promotion effect from pooling level 1 is 1.6, and the promotion effect from pooling level 2 is 2.

The promotion demand using the promotion effect from pooling level 1 is 19.2 (week 5) and 20 (week 9). The promotion demand using the promotion effect from pooling level 2 is 24 (week 5) and 25 (week 9). The promotion demand is determined using equation 1 above, where the non-promoted demand is multiplied with the effect.

The calculated MAPE at 514 for pooling level 1 is 6.545455 (calculated as 100/2*(ABS(20−19.2)/20+ABS(22−20)/22). The calculated MAPE for pooling level 1 is 16.81818 (calculated as 100/2*(ABS(20−24)/20+ABS(22−25)/22.

Based on the above, at 516, because the error yield by the effects calculated at pooling level 1 is less than for pooling level 2, the level 1 promotion effects are selected.

FIG. 7 illustrates a simple example where there is one promotion effect estimated at two pooling levels. In actual applications, there typically will be sets of 10+ promotions defined, and each set will be estimated at every pooling level—typically 5 or even more levels, and the outcome is the set of promotion effects coming from one of the 10 levels.

At 518, the demand forecast is calculated using the demand model disclosed above, and all of the seasonality curves and promotion effects that were retained after the functionality above.

At 520, the determined demand forecast is used for manufacturing production, shipping logistics, and inventory control. The final demand forecast is sent to other specific purpose computers in one embodiment, such as an inventory control system, a manufacturing system, a shipping and logistics system, and a sales assistance system. The final demand forecast in one embodiment is in the form of individual data bits that have been translated from the demand forecast and that are stored and transmitted to other specialized computer systems, where they are stored and utilized by those systems. As a result, additional items may be manufactured, stored, shipped, etc. and items can be optimally priced.

As disclosed, one goal of embodiments is to select the relevant features for items to ultimately maximize forecast accuracy. A good forecast generally receives no credit. Items are always available and they sell at the full price, as opposed to discounted prices. Inventory levels should not be too high, so retailers do not have money tied up in inventory. Retailers and suppliers should be able to reliably plan workforce and production capacity.

However, if the forecast is wrong (i.e., not accurate) the picture changes dramatically. The effects can have a negative impact on many business areas. For example, if the forecast is too low, fewer than needed products arrive at the retailer and they sell out. An out of stock situation impacts a retailer through lost revenue and reduced customer satisfaction. A low forecast also impacts suppliers, which have to scale down production, and review their need for the current workforce.

If the forecast is too high, there are also negative effects. The retailers will order more than they can sell. If the products are perishable, they may go bad, increasing wastage. Even if they are not perishable, the retailers may sell the extra items at discounted prices, which negatively affects revenue. The retailers may otherwise return the merchandise to the suppliers. This impacts the suppliers because they have extra products for which there is no demand. Further, the manufacturers may waste time and money producing the wrong thing, which negatively affects the supplier's revenue.

Figure 8:
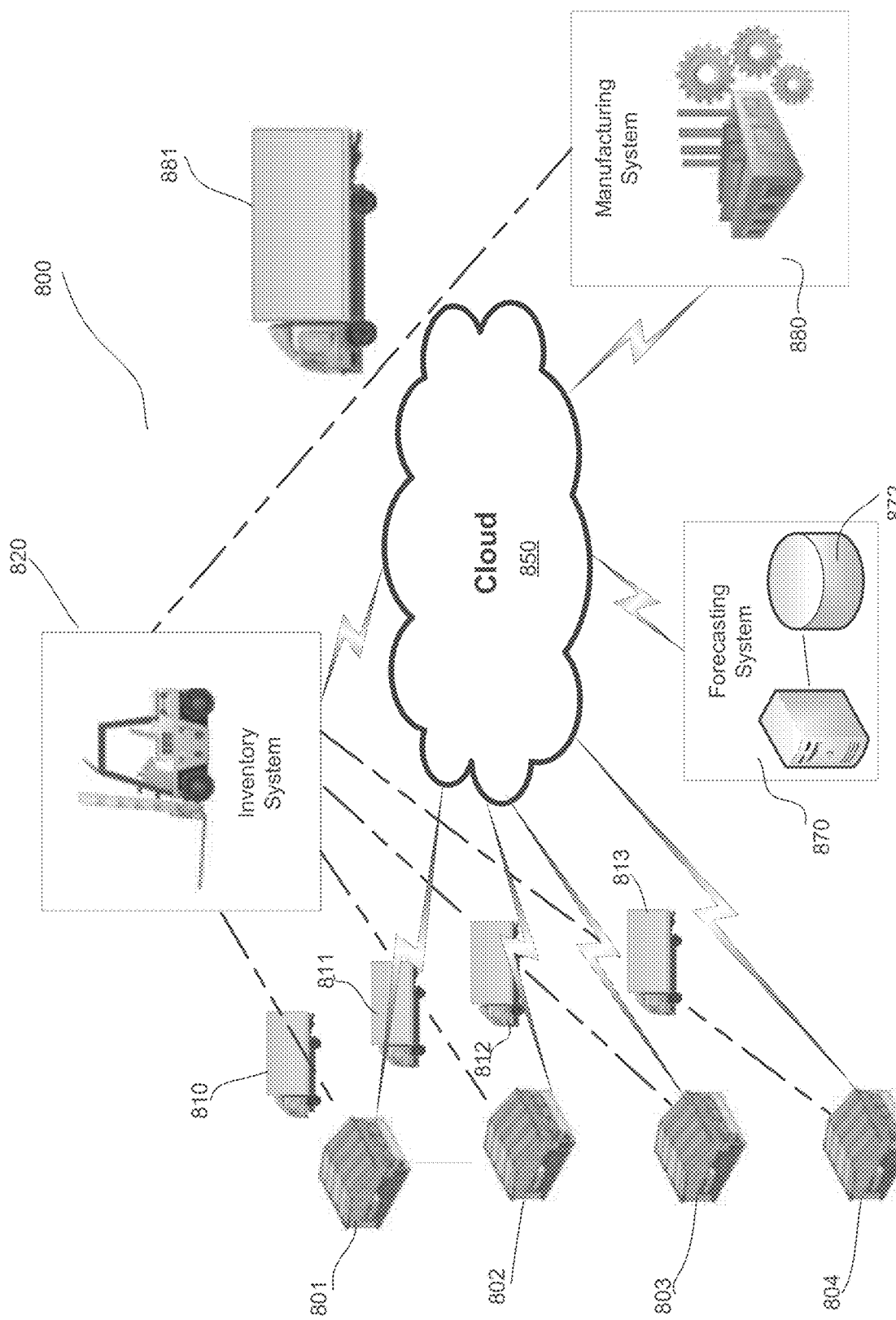
FIG. 8 illustrates an integrated manufacturing, inventory and logistics system that includes demand forecasting as disclosed herein in accordance with one embodiment.

FIG. 8 illustrates an integrated manufacturing, inventory and logistics system 800 that includes demand forecasting as disclosed herein in accordance with one embodiment. As shown in FIG. 8, system 800 can include a product forecasting system 870 that forecasts future product demand and in some instances forecasts and/or considers future demand for hundreds of thousands of products, or in some applications tens of millions or more products at one or more retail stores 801-804. Forecasting system 870 is in communication through a cloud network 850 or other type of communications network with one or more inventory systems 820 and one or more manufacturing systems 880.

Forecasting system 870 generates demand forecasting by implementing the functionality disclosed in conjunction with FIGS. 2 and 5 above. Inventory system 820 stores inventory and provides transportation logistics to deliver items to stores 801-804 using trucks 810-813 or some other transportation mechanisms. Inventory system 820 in one embodiment implements an Enterprise Resource Planning ("ERP") specialized computer system or a specialized inventory control system that uses input from forecasting system 810 to determine levels of inventories and the amount and timing of the delivery of items to stores 801-804.

Manufacturing system 880 manufactures items to be sent to inventory system 820 and provides transportation logistics to deliver the items to inventory system 820 using a truck 881 or some other transportation mechanisms. Manufacturing system 880 in one embodiment implements an ERP specialized computer system or a specialized manufacturing system that uses input from forecasting system 870 to determine an amount of items to manufacture, inventory of resources that are used for the manufacturing, and the amount and timing of the delivery of items to inventory system 820.

Forecasting system 870 can utilize information from inventory system 820, a sales tracking system (not shown) and/or databases in forecasting demand for products. In forecasting demand, forecasting system 870 attempts to predict uncharacteristic demand of one or more products that results from events, weather, social demand, economic factors and other factors. Tens, to hundreds to thousands of different variables may be tracked that can have an effect on the demand of one or more products. Changes in these variables can result in uncharacteristic demands. For example, changes in forecasted weather can be tracked, and one or more variables associated with the forecasted weather can be used in determining whether such a change is weather may have an effect on demand, and may further forecast a change in demand.

In general, the elements of FIG. 8 perform sales, manufacturing, or consumption of inventory. Retail locations/stores 801-804 for direct consumer sales exhibit the most volatile inventory patterns, due to the random nature and external factors affecting sales. However, manufacturing facilities and sites that consume inventory (such as product integrators, internet shippers, etc. products used in the local facility) also benefit from demand forecasting as disclosed herein. As disclosed, each retail location 801-804 sends sales data and historic forecast data to forecasting system 870. The sales data includes inventory depletion statistics for each item, or SKU/UPC for each sales period, typically days, in the previous sales cycles (i.e. weeks), typically 4-7 weeks of inventory cycles.

Forecasting system 870 stores the sales data in a repository 872, and employs the sales data for generating orders to replenish inventory. The orders include a set of items and a quantity for each item for maintaining the inventory level at a store 801-804.

Many retail ordering schemes rely on days of the week for sales periods and sales cycles. In one configuration, in an inventory management environment having inventory statistics, in which the inventory statistics are specific to each day of the week, inventory system 820 determines target inventory levels by gathering, for each day of the week, inventory level statistics from previous sales. Embodiments compute, based on the inventory level statistics, an inventory level for each day of the week, such that the safety stock accommodates variations in inventory between the different days of the week. Embodiments render, for each of a plurality of items, a stocking level indicative of the target inventory level including the safety stock for each day of the week. Embodiments compute an ordering quantity based on a lead time such that the ordered quantity arrives to satisfy the rendered stocking level on the determined day of the week. Identifying the actual stock levels includes identifying stock levels on the day of the week from previous weeks from the history data, thus focusing on the same day of the week over time, rather than an average of all days in the week.

In particular configurations, the disclosed embodiments may be employed in conjunction with specialized and/or particularly high volume retail sales environments. In large logistics and distribution operations, it is beneficial to load trucks as full as possible, and in the event deferral of items to a successive trip is needed, to select those items which will have a least likely chance of interrupting sales activity. Accordingly, embodiments are operable in conjunction with POS system 100 to identify high velocity or high turnover items that tend to be sold and replenished faster than other items. A UPC bar code symbol or radio-frequency identification ("RFID") on an item includes a field, designation or value, that alone or in conjunction with a database lookup, designates an item as a high velocity item appropriate for safety stock treatment as defined herein.

A high velocity item may be accommodated by identifying, for each of a plurality of items represented in an inventory database, a field for a product identifier and a field denoting a safety stock for the item, and determining, for each of the product identifiers, a product segmentation field based on product velocity indicative of increased product replenishment demands resulting from a sales volume. The disclosed embodiments determine based on the velocity field, whether to compute a safety stock, i.e. whether the overhead and burden to resupply according to the safety stock is worthwhile given the product throughput.

In other embodiments, supply logistics may invoke a delivery frequency higher than one truck a day, hence triggering a resupply window with a higher granularity. In such a case, the safety stock may be more specific than an individual day, such as a Monday AM and Monday PM, or to designate multiple delivery or time windows within a particular day of the week, such as 7:00 AM, 11:00 AM and 4:00 PM.

Embodiments, including the generated demand forecast, may be employed in implementing supply logistics and designating deliveries (i.e., trucks) and manifest (i.e., contained items) in accordance with demand and profit margins of the transported items. High velocity items might be deemed to have priority space on a particular delivery, but could further be selected based on a profit margin or markup on the included items, and items with the greatest revenue generation potential selected for inclusion.

In such a product inventory shipping environment that uses the demand forecast disclosed herein and has a plurality of transport vehicles, each vehicle (e.g., truck) is configured for receiving a fixed payload of items for delivery to a sales location for inventory replenishment. Embodiments can provide guidance in loading a delivery vehicle, by, for each item of a plurality of items including a first item and a second item, computing a safety stock and determining, based on the computed safety stock of the first item and the second item, a quantity of each of the first item and the second item to be loaded into the delivery vehicle. Embodiments recompute a truck loading quantity based on the safety stock if insufficient space is available in the delivery vehicle for the determined quantity of the first item and the second item, meaning that certain items would need to be omitted and deferred to a successive delivery.

As disclosed, embodiments generate a demand model by automatically determining reliable seasonality curves and promotion effects, and discarding unreliable parameters. As a result, the demand model will be optimized for forecasting demand based on the existing historical data.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of selecting demand forecast parameters for a demand model for one or more items, the method comprising:
    receiving historical sales data for the items on a per store basis;
    receiving a plurality of seasonality curves for a first item, each of the seasonality curves representing seasonal variations for demand for the first item;
    determining a repeatability of each of the seasonality curves using a correlation of each seasonality curve over year to year demand and retaining a first seasonality curve based on the repeatability;
    determining a smoothness of the first seasonality curve comprising determining a standard deviation of the first seasonality curve;
    determining a sparsity of the first seasonality curve comprising determining if the first seasonality curve comprises a number of data points that exceed a predetermined threshold;
    based on the determined repeatability, smoothness and sparsity, determine that the first seasonality curve is reliable;
    repeating the receiving the plurality of seasonality curves, determining the repeatability, determining the smoothness, and determining the sparsity to determine a plurality of reliable seasonality curves;
    using the demand model and the reliable seasonality curves, determining a demand forecast for the first item, the demand forecast comprising a prediction of further sales data for the first item;
    electronically sending the demand forecast to an inventory management system; and
    at the inventory management system, based on the received demand forecast, electronically determining an amount of inventory for the item for a first store of a plurality of stores and causing the amount of inventory to be sent, using a transportation mechanism, to the first store.

2. The method of claim 1, wherein the historical sales data comprises a plurality of promotion effects for the first item, further comprising:
    determining a sparsity of the promotion effects;
    determining a regression intercept of the promotion effects;
    based on the sparsity and the regression intercept of the promotion effects, determining a plurality of reliable promotion effects; and
    using the demand model, the reliable seasonality curves, and the reliable promotion effects, determining the demand forecast for the first item.

3. The method of claim 2, wherein each of the seasonality curves are aggregate seasonality curves comprising parameters for other items in addition to the first item.

4. The method of claim 2, wherein each of the seasonality curves comprise at least two sales cycles of the first item.

5. The method of claim 2, further comprising:
    based on the demand forecast, increasing an amount of manufacturing of the first item and, in response to the increased amount of manufacturing, shipping the increased amount of first items to a plurality of different retail stores.

6. The method of claim 2, wherein the demand forecast consists of a base demand, the reliable seasonality curves, and the reliable promotion effects.

7. The method of claim 1, further comprising:
generating a best fit model as the demand model, the selecting comprising:
receiving a plurality of sets of promotional effects for the first item, each set corresponding to a different pooling level of the first item;
simulating an historical demand at each pooling level;
determining an error metric at each pooling level;
using the set of promotional effects that correspond to the pooling level with the lowest metric error as an optimized set of promotional effects; and
generating the best fit model with the optimized set of promotional effects while discarding the remaining sets of promotional effects.

8. A non-transitory computer-readable medium having instructions stored thereon that, when executed by a processor, cause the processor to determine reliable demand forecast parameters for a demand model for one or more items, comprising:
receiving historical sales data for the items on a per store basis;
receiving a plurality of seasonality curves for a first item, each of the seasonality curves representing seasonal variations for demand for the first item;
determining a repeatability of each of the seasonality curves using a correlation of each seasonality curve over year to year demand and retaining a first seasonality curve based on the repeatability;
determining a smoothness of the first seasonality curve comprising determining a standard deviation of the first seasonality curve;
determining a sparsity of the first seasonality curve comprising determining if the first seasonality curve comprises a number of data points that exceed a predetermined threshold;
based on the determined repeatability, smoothness and sparsity, determine that the first seasonality curve is reliable;
repeating the receiving the plurality of seasonality curves, determining the repeatability, determining the smoothness, and determining the sparsity to determine a plurality of reliable seasonality curves;
using the demand model and the reliable seasonality curves, determining a demand forecast for the first item, the demand forecast comprising a prediction of further sales data for the first item;
electronically sending the demand forecast to an inventory management system; and
at the inventory management system, based on the received demand forecast, electronically determining an amount of inventory for the item for a first store of a plurality of stores and causing the amount of inventory to be sent, using a transportation mechanism, to the first store.

9. The non-transitory computer-readable medium of claim 8, wherein the historical sales data comprises a plurality of promotion effects for the first item, further comprising:
determining a sparsity of the promotion effects;
determining a regression intercept of the promotion effects;
based on the sparsity and the regression intercept of the promotion effects, determining a plurality of reliable promotion effects; and
using the demand model, the reliable seasonality curves, and the reliable promotion effects, determining the demand forecast for the first item.

10. The non-transitory computer-readable medium of claim 9, wherein each of the seasonality curves are aggregate seasonality curves comprising parameters for other items in addition to the first item.

11. The non-transitory computer-readable medium of claim 9, wherein each of the seasonality curves comprise at least two sales cycles of the first item.

12. The non-transitory computer-readable medium of claim 9, further comprising:
based on the demand forecast, causing an increase in an amount of manufacturing of the first item and, in response to the increased amount of manufacturing, shipping the increased amount of first items to a plurality of different retail stores.

13. The non-transitory computer-readable medium of claim 9, wherein the demand forecast consists of a base demand, the reliable seasonality curves, and the reliable promotion effects.

14. The non-transitory computer-readable medium of claim 8, further comprising:
generating a best fit model as the demand model, the selecting comprising:
receiving a plurality of sets of promotional effects for the first item, each set corresponding to a different pooling level of the first item;
simulating an historical demand at each pooling level;
determining an error metric at each pooling level;
using the set of promotional effects that correspond to the pooling level with the lowest metric error as an optimized set of promotional effects; and
generating the best fit model with the optimized set of promotional effects while discarding the remaining sets of promotional effects.

15. A retail item demand forecasting system comprising:
one or more processors coupled to one or more point of sale systems, the processors receiving historical sales data for retail items on a per store basis;
the processors further:
receiving a plurality of seasonality curves for a first item, each of the seasonality curves representing seasonal variations for demand for the first item;
determining a repeatability of each of the seasonality curves using a correlation of each seasonality curve over year to year demand and retaining a first seasonality curve based on the repeatability;
determining a smoothness of the first seasonality curve comprising determining a standard deviation of the first seasonality curve;
determining a sparsity of the first seasonality curve comprising determining if the first seasonality curve comprises a number of data points that exceed a predetermined threshold;
based on the determined repeatability, smoothness and sparsity, determine that the first seasonality curve is reliable;
repeating the receiving the plurality of seasonality curves, determining the repeatability, determining the smoothness, and determining the sparsity to determine a plurality of reliable seasonality curves;
using the demand model and the reliable seasonality curves, determining a demand forecast for the first item, the demand forecast comprising a prediction of further sales data for the first item;

electronically sending the demand forecast to an inventory management system; and at the inventory management system, based on the received demand forecast, electronically determining an amount of inventory for the item for a first store of a plurality of stores and causing the amount of inventory to be sent, using a transportation mechanism, to the first store.

16. The system of claim 15, wherein the historical sales data comprises a plurality of promotion effects for the first item, the processors further:

determining a sparsity of the promotion effects;

determining a regression intercept of the promotion effects;

based on the sparsity and the regression intercept of the promotion effects, determining a plurality of reliable promotion effects; and using the demand model, the reliable seasonality curves, and the reliable promotion effects, determining the demand forecast for the first item.

17. The system of claim 16, wherein each of the seasonality curves are aggregate seasonality curves comprising parameters for other items in addition to the first item.

18. The system of claim 16, the processors further:

based on the demand forecast, causing an increase in an amount of manufacturing of the first item and, in response to the increased amount of manufacturing, causing a shipping of the increased amount of first items to a plurality of different retail stores.

19. The system of claim 16, wherein the demand forecast consists of a base demand, the reliable seasonality curves, and the reliable promotion effects.

20. The system of claim 15, the processors further:

generating a best fit model as the demand model, the selecting comprising:

receiving a plurality of sets of promotional effects for the first item, each set corresponding to a different pooling level of the first item;

simulating an historical demand at each pooling level;

determining an error metric at each pooling level;

using the set of promotional effects that correspond to the pooling level with the lowest metric error as an optimized set of promotional effects; and generating the best fit model with the optimized set of promotional effects while discarding the remaining sets of promotional effects.

* * * * *